United States Patent
Lee et al.

(10) Patent No.: US 11,610,733 B2
(45) Date of Patent: Mar. 21, 2023

(54) MULTILAYER CAPACITOR

(71) Applicant: SAMSUNG ELECTRO-MECHANICS CO., LTD., Suwon-si (KR)

(72) Inventors: Daehee Lee, Suwon-si (KR); Sanghyuk Lee, Suwon-si (KR); Kwanwoo Song, Suwon-si (KR); Soojeong Jo, Suwon-si (KR); Jong Hwa Lee, Suwon-si (KR); Bermha Cha, Suwon-si (KR); Dongjun Jung, Suwon-si (KR); Yun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/224,738

(22) Filed: Apr. 7, 2021

(65) Prior Publication Data

US 2022/0139620 A1   May 5, 2022

(30) Foreign Application Priority Data

Oct. 30, 2020  (KR) .................. 10-2020-0142695

(51) Int. Cl.
| | |
|---|---|
| *H01G 4/12* | (2006.01) |
| *H01G 4/30* | (2006.01) |
| *H01G 4/232* | (2006.01) |

(52) U.S. Cl.
CPC .............. *H01G 4/12* (2013.01); *H01G 4/232* (2013.01); *H01G 4/30* (2013.01)

(58) Field of Classification Search
CPC ............ H01G 4/30; H01G 4/12; H01G 4/232
USPC ............. 361/311, 321.1, 301.4, 321.5
See application file for complete search history.

(56) References Cited

U.S. PATENT DOCUMENTS

| | | | | |
|---|---|---|---|---|
| 2008/0117561 A1* | 5/2008 | Tani | ............ | B82Y 30/00 |
| | | | | 361/311 |
| 2009/0081372 A1* | 3/2009 | Sugimura | ............ | C04B 41/009 |
| | | | | 427/383.1 |
| 2010/0103587 A1* | 4/2010 | Kawamoto | ............ | C04B 35/47 |
| | | | | 361/321.1 |
| 2013/0258547 A1 | 10/2013 | Mizuno | | |

(Continued)

FOREIGN PATENT DOCUMENTS

| | | |
|---|---|---|
| JP | 2006-096585 A | 4/2006 |
| JP | 5629719 B2 | 11/2014 |

OTHER PUBLICATIONS

P. Sotta, et al., "The crossover from 2D to 3D percolation: Theory and numerical simulations," Eur. Phys. J. E. vol. 11, 2003, pp. 375-388.

(Continued)

*Primary Examiner* — Arun Ramaswamy
(74) *Attorney, Agent, or Firm* — Morgan, Lewis & Bockius LLP

(57) ABSTRACT

A multilayer capacitor includes a body including a multilayer structure in which a plurality of dielectric layers are stacked and a plurality of internal electrodes stacked with the dielectric layer interposed therebetween and external electrodes disposed on an exterior of the body and connected to the internal electrodes. At least one of the plurality of dielectric layers includes a plurality of grains, and a ratio of grains having dislocations, among the plurality of grains, is 20% or greater.

18 Claims, 12 Drawing Sheets

(56) References Cited

U.S. PATENT DOCUMENTS

2014/0210048 A1\* 7/2014 Kawamoto ............ B82Y 30/00
  257/532
2019/0172640 A1\* 6/2019 Inomata ............... H01G 4/1227
2019/0241476 A1\* 8/2019 Nomura ................. C04B 35/47

OTHER PUBLICATIONS

P.J. Phillips, et al., "Diffraction contrast STEM of dislocations: Imaging and simulations," Ultramicroscopy 111 (2011), pp. 1483-1487.

\* cited by examiner

A

MULTILAYER CAPACITOR

CROSS-REFERENCE TO RELATED APPLICATION

This application claims benefit of priority to Korean Patent Application No. 10-2020-0142695 filed on Oct. 30, 2020 in the Korean Intellectual Property Office, the disclosure of which is incorporated herein by reference in its entirety.

TECHNICAL FIELD

The present disclosure relates to a multilayer capacitor.

BACKGROUND

A capacitor is a device capable of storing electricity in which electricity is generally accumulated in each of two facing electrodes when a voltage is applied thereto. When a direct current (DC) voltage is applied, current flows in the capacitor, while electricity is accumulated therein, and when accumulation is completed, no current flows. Meanwhile, when an alternating current (AC) voltage is applied, AC current flows, while polarities of electrodes alternate.

Capacitors may be classified into various types such as an aluminum electrolytic capacitor in which electrodes are formed of aluminum and a thin oxide film is provided between the aluminum electrodes, a tantalum capacitor using tantalum as a material of electrodes, a ceramic capacitor using a high-k dielectric material such as titanium oxide, barium oxide, or the like, between electrodes, a multilayer ceramic capacitor (MLCC) using a multilayer structure of high-k ceramics as a dielectric material provided between electrodes, a film capacitor using a polystyrene film as a dielectric material between electrodes, and the like.

Among such capacitors, the MLCC advantageously has excellent temperature characteristics and frequency characteristics, may be implemented in a small size, and thus has been widely applied in various fields such as high-frequency circuits. In recent years, attempts to implement a smaller multilayer ceramic capacitor have continued, and to this end, a dielectric layer and an internal electrode are formed to be thin. As the dielectric layer becomes thinner, an electric field applied to the dielectric layer at the same driving voltage increases, and thus, a DC bias capacity, an effective capacity of the MLCC, needs to be sufficiently secured when a DC electric field is applied. In addition, it is necessary to design the MLCC to minimize a high-temperature effective capacity reduction phenomenon due to heating, in line with the trend for integration and miniaturization of electronic devices in which the MLCC is used.

Specifically, in general, the DC bias capacity decreases as a grain size of the dielectric material increases. Therefore, it is necessary to reduce the grain size in order to secure the DC bias capacity. In addition, in order to alleviate the high-temperature capacity reduction phenomenon, grain growth of the dielectric material should be suppressed to maintain a high core ratio in a core/shell structure. However, the reduction in the grain size by suppressing the grain growth of the dielectric material causes a reduction in a dielectric constant, making it difficult to secure a high level of capacitance. Therefore, there is a demand for a technology capable of securing a DC bias capacity and a high-temperature effective capacity without suppressing grain growth of a dielectric material in the art.

SUMMARY

An aspect of the present disclosure may provide a multilayer capacitor in which a DC bias capacity is improved and a high-temperature effective capacity reduction phenomenon is minimized by controlling a density of dislocations of a dielectric layer.

According to an aspect of the present disclosure, a multilayer capacitor may include a body including a multilayer structure in which a plurality of dielectric layers are stacked and a plurality of internal electrodes stacked with the plurality of dielectric layers interposed therebetween; and external electrodes disposed on an exterior of the body and connected to the internal electrodes. At least one of the plurality of dielectric layers includes a plurality of grains, and a ratio of grains having dislocations, among the plurality of grains, is 20% or greater.

The dislocations may be spaced apart grain boundaries between the plurality of grains.

The dislocations in one of the plurality of grains may be in contact with only one grain boundary among grain boundaries between the one of the plurality of grains and other grains of the plurality of grains.

A dislocation within one of the plurality of grains may be disposed between a phase having a tetragonal crystal structure and a phase having a cubic crystal structure.

A portion of the plurality of grains may have a plurality of dislocations.

The ratio of grains having dislocations, among the plurality of grains, maybe a value obtained by averaging values measured in at least four unit areas among cut surfaces of the dielectric layer.

The ratio of grains having dislocations, among the plurality of grains, may be 40% or less.

Each of the dislocations may be spaced apart from grain boundaries between the plurality of grains, or may be in contact with only one grain boundary among the grain boundaries of the plurality of grains.

According to an aspect of the present disclosure, a multilayer capacitor may include a body including a multilayer structure in which a plurality of dielectric layers having grains are stacked and a plurality of internal electrodes are stacked with the plurality of dielectric layers interposed therebetween; and external electrodes disposed on an exterior of the body and connected to the internal electrodes. A ratio of grains having dislocations in a region of the body, among grains in the region of the body, is 20% or greater.

According to an aspect of the present disclosure, a multilayer capacitor may include a body including a multilayer structure in which a plurality of dielectric layers having grains are stacked and a plurality of internal electrodes are stacked with the plurality of dielectric layers interposed therebetween; and external electrodes disposed on an exterior of the body and connected to the internal electrodes. An average of ratios of grains having dislocations among grains respectively obtained in a plurality of unit areas in a cut surface of the body, is 20% or greater.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
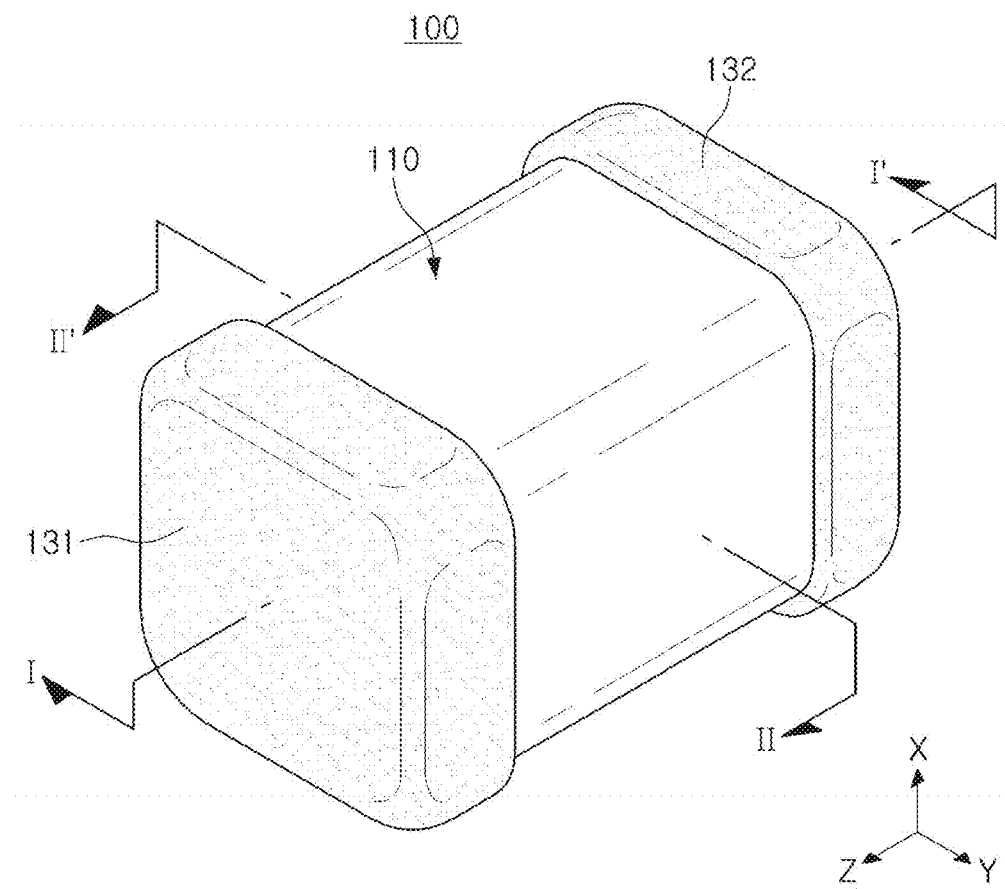
FIG. 1 is a perspective view schematically illustrating an appearance of a multilayer capacitor according to an exemplary embodiment in the present disclosure.
Figure 2:
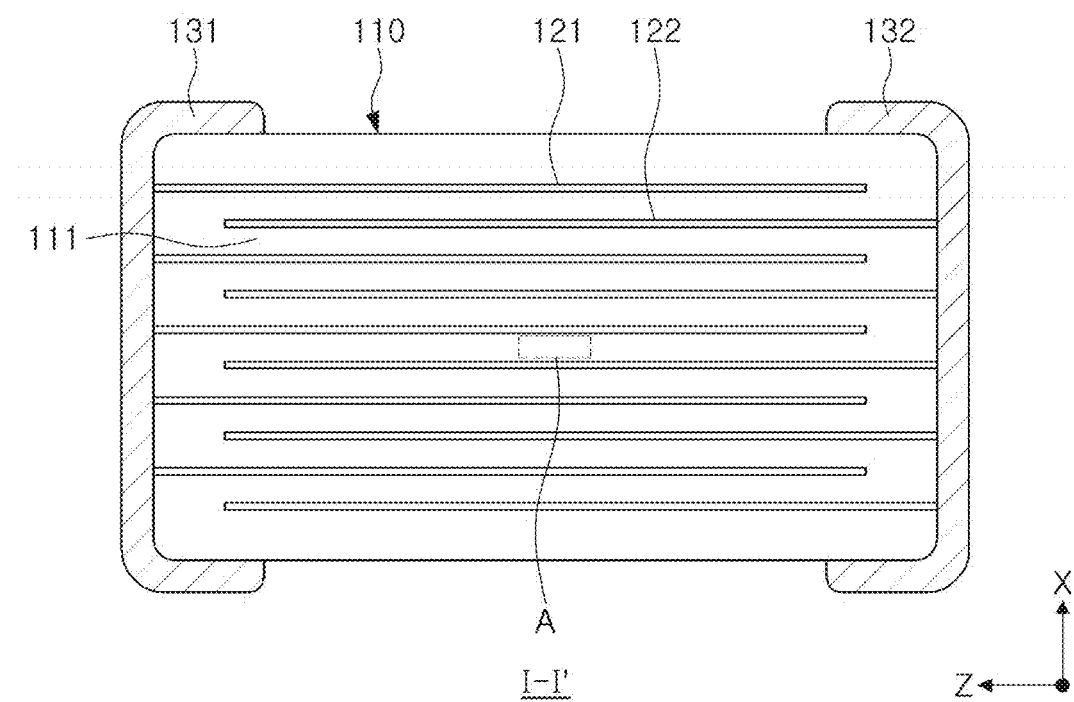
FIG. 2 is a cross-sectional view of the multilayer capacitor of FIG. 1, taken along line I-I'.
Figure 3:
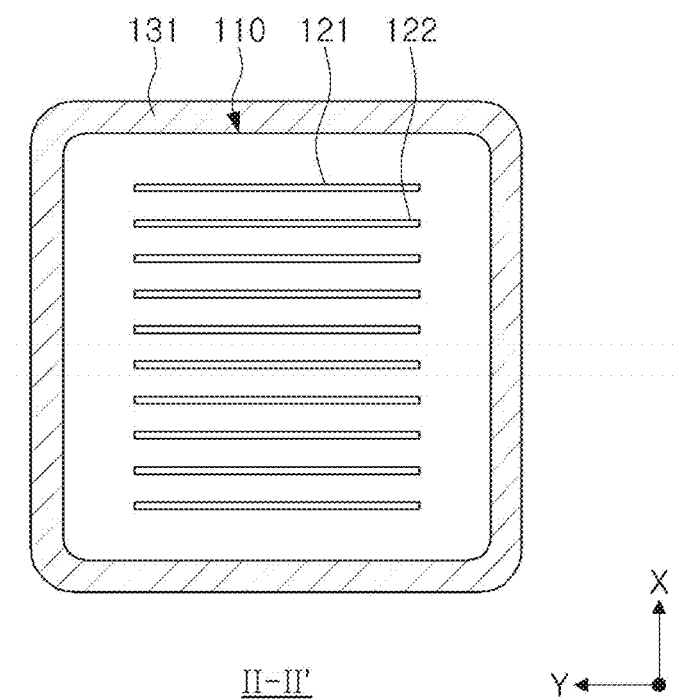
FIG. 3 is a cross-sectional view of the multilayer capacitor of FIG. 1, taken along line II-II'.
Figure 4:
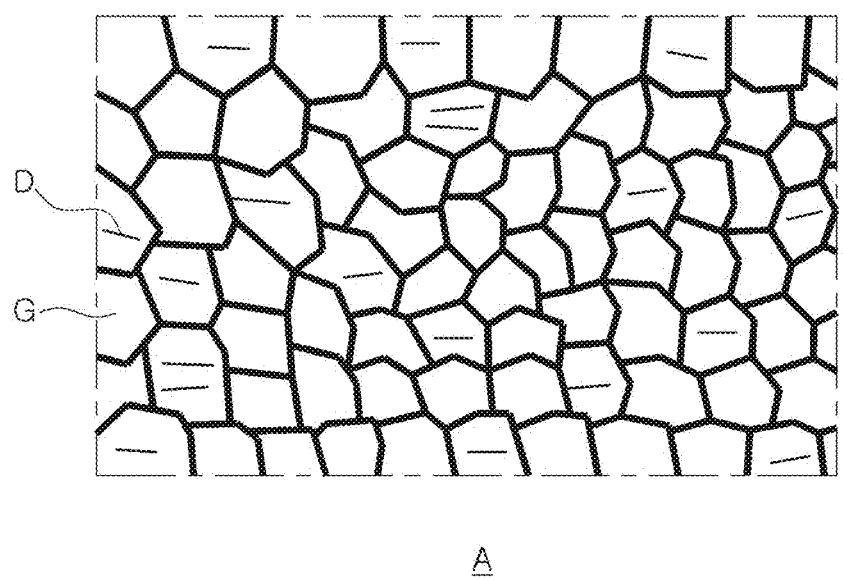
FIG. 4 is an enlarged view of region A in FIG. 2, schematically illustrating grains of a dielectric layer.

FIG. 1 is a perspective view schematically illustrating an appearance of a multilayer capacitor according to an exemplary embodiment in the present disclosure. FIG. 2 is a cross-sectional view of the multilayer capacitor of FIG. 1, taken along line I-I'. FIG. 3 is a cross-sectional view of the multilayer capacitor of FIG. 1, taken along line II-II'. FIG. 4 is an enlarged view of region A in FIG. 2, schematically illustrating grains of a dielectric layer.

Referring to FIGS. 1 through 4, a multilayer capacitor 100 according to an exemplary embodiment in the present disclosure includes a body 110 including a dielectric layer 111 and a plurality of internal electrodes 121 and 122 stacked with the dielectric layer 111 interposed therebetween and external electrodes 131 and 132. At least one of the plurality of dielectric layers 111 includes a plurality of grains G, and a portion of the plurality of gains G has dislocation D. Here, the ratio of the grains G including the dislocation D, among the plurality of grains G is 20% or greater, and when this condition is met, a DC bias capacity of the multilayer capacitor 100 may be improved, while a high-temperature effective capacity reduction phenomenon is minimized.

The body 110 includes a multilayer structure in which a plurality of dielectric layers 111 are stacked in a first direction (X direction) and may be obtained, for example, by stacking a plurality of green sheets and then sintering the plurality of green sheets. Through the sintering process, the plurality of dielectric layers 111 may have an integrated form. As shown in FIG. 1, the body 110 may have a shape similar to a rectangular parallelepiped. The dielectric layer 111 included in the body 110 may include a ceramic material having a high dielectric constant, for example, BT-based, i.e., a barium titanate ($BaTiO_3$)-based ceramic, but other materials known in the art may also be used as long as sufficient capacitance is obtained. The dielectric layer 111 may further include an additive, an organic solvent, a plasticizer, a binder, and a dispersant, if necessary, along with such a ceramic material as a main ingredient. Here, the additive may include a metal component and may be added in the form of a metal oxide during a manufacturing process. An example of such a metal oxide additive may include at least one of $MnO_2$, $Dy_2O_3$, $BaO$, $MgO$, $Al_2O_3$, $SiO_2$, $Cr_2O_3$, and $CaCO_3$.

The plurality of internal electrodes 121 and 122 may be obtained by printing a paste containing a conductive metal to a predetermined thickness on one surface of a ceramic green sheet and then sintering the paste. In this case, as shown in FIG. 2, the plurality of internal electrodes 121 and 122 may include first and second internal electrodes 121 and 122 in the third direction (Z direction) of the body 110 facing each other. Here, the third direction (Z direction) may be a direction perpendicular to the first direction (X direction) and the second direction (Y direction). The first and second internal electrodes 121 and 122 may be connected to different external electrodes 131 and 132 to have opposite polarities when driven, and may be electrically separated from each other by a dielectric layer 111 disposed therebetween. However, the number of the external electrodes 131 and 132 or a method for connecting the external electrodes with the internal electrodes 121 and 122 may vary according to exemplary embodiments. The main ingredient materials of the internal electrodes 121 and 122 may include nickel (Ni), copper (Cu), palladium (Pd), silver (Ag), and the like, and alloys thereof may also be used.

The external electrodes 131 and 132 may be formed on an exterior of the body 110 and may include first and second external electrodes 131 and 132 connected to the first and second internal electrodes 121 and 122, respectively. The external electrodes 131 and 132 may be formed by a method of preparing a material containing a conductive metal as a paste and then applying the paste to the body 110. Examples of the conductive metal include nickel (Ni), copper (Cu), palladium (Pd), gold (Au), or alloys thereof. Here, the external electrodes 131 and 132 may further include a plating layer including Ni, Sn, or the like.

As described above, in the case of the present exemplary embodiment, at least one of the plurality of dielectric layers 111 includes a plurality of grains G, and the ratio of the grains G including dislocation D among the plurality of grains G may be 20% or greater. In general, it is known that it is preferable for the grains G to have fewer dislocations, but research of the present inventors showed that presence of the dislocations D in the grains G improved characteristics such as DC bias or the like. As described above, the dielectric layer 111 may include the barium titanate component and an additive component added thereto, and in the grains G, a ferroelectric phase having a tetragonal crystal structure and a relaxor phase having a cubic crystal structure coexists. When these two phases are aligned in a c-axis direction, the DC bias capacity may be improved. In other words, the DC bias capacity in principle refers to a capacity when domains are aligned in the c-axis direction when a DC electric field is applied. Therefore, if the domains inside the dielectric material are fabricated to be aligned in the c-axis direction, a reduction in capacity due to domain wall pinning may be minimized.

In this manner, when the ferroelectric phase and the relaxor phase are aligned in one direction, a plurality of dislocations may occur in order to make the two phases stable and aligned in one direction. The reason for this is because stress increases in the c-axis direction. As a result, an increase in density of the dislocations D of the dielectric layer 111 may lead to an increase in the DC bias capacity. Furthermore, the increase in the density of the dislocations D may reduce a contribution of extrinsic capacity due to the domain wall vibration having a large temperature influence, and thus a high-temperature effective capacity reduction may be reduced. However, excessively high density of the dislocations D may degrade performance and reliability of the dielectric layer 111. Specifically, when cracks propagate, the dislocations D, which are line defects, may become a crack propagation path, and thus, the dislocations may be a region with weak mechanical strength. In addition, the dislocations D may be a transfer path of charges due to a high concentration of charges chemically, which may act as a conduction path of a leakage current. It is necessary to determine an upper limit of the density of the dislocations D in consideration of these side effects, and the ratio of the grains having dislocations D among the plurality of grains G may be set to 40% or less.

Referring to a shape of the dislocation D, a measurement method, and a method of implementing a high dislocation density, first, as shown in FIG. 4, the dislocation D may not be in contact with a grain boundary between a plurality of grains G, or a portion of a dislocation D may be formed to be in contact with only one grain boundary and does not completely traverse the grain G. In this case, as described above, the dislocation D may be formed between a phase having a tetragonal crystal structure and a phase having a cubic crystal structure in the grain G. In addition, a portion of the plurality of grains G may have a plurality of dislocations D.

In the case of a method of determining and measuring the dislocations D, for example, at least four points may be set on one cut surface of the dielectric layer 111, and values of calculating the ratio of the grains G having the dislocations D per unit area based on the set points may be averaged and obtained.

In one example, the cut surface may include a cut surface cut the body 110 in the first direction (X direction)-third direction (Z direction) plane, or a cut surface cut the body 110 in the first direction (X direction)-second direction (Y direction) plane. In a case that the cut surface includes a surface cut the body 110 in the first direction (X direction)-third direction (Z direction) plane, the cut surface may cut a central portion of the body 110 in the second direction (Y direction), and in a case that the cut surface includes a surface cut the body 110 in the first direction (X direction)-second direction (Y direction) plane, the cut surface may cut a central portion of the body 110 in the third direction (Z direction). The location of the cut surface is not limited to these examples, and one of ordinary skill may select the cut surface at other locations in the body 110, if needed. For example, when multiple measurements are performed at different cut surfaces, the cut surfaces may be in the first direction (X direction)-third direction (Z direction) plane and have an internal in the second direction (Y direction) set by one of ordinary skill in the art, or in the first direction (X direction)-second direction (Y direction) plane and have an internal in the third direction (Z direction) set by one of ordinary skill in the art.

The unit area may have a square shape, and may have a size of, for example, 5 μm×5 μm, 4 μm×4 μm, 3 μm×3 μm, 2 μm×2 μm, or 1 μm×1 μm. The unit area may not be limited to a square shape. For example, the unit area may have a rectangular shape having one side having a length from 1 to 5 μm and another side having a width from 1 to 5 μm. For another example, the unit area may have a circular shape having a diameter from 1 to 5 μm. The size and the shape of unit are not limited to these examples, and one of ordinary skill may select other sizes or shapes, if needed. In one example, the shape and the size of unit area may be determined to allow 150 or more grains therewithin to be measured or investigated for statistical analysis. However, the number of grains for statistical analysis may not be limited to such an example.

The unit area in the measurement may be located at a central portion of the cut surface, for example. In a case multiple measurements are performed at different locations of the same cut surface, one of the measurements may be performed at the central portion of the cut surface, and the remaining measurements may be performed at portions having an interval from the central portion set by one of ordinary skill in the art. The location of the unit area may not be limited thereto, and may be selected differently by one of ordinary skill in the art, if needed.

It should be understood that the same standard may be applied to determine whether grains associated with the measured unit area are counted in determining the ratio of grains having dislocations with respect to overall grains in the measured unit area. For example, the grains counted in the measurement may include the grains completely inside the selected unit area, and also include the grains tangent to the boundary or touching the boundary of the selected unit area but not crossing the boundary of the selected unit area. Alternatively, the grains counted in the measurement may include the grains completely inside the selected unit area, and also include the grains touching the boundary of the selected unit area or crossing the boundary of the selected unit area.

In one example, the unit area in the measurement may be within one of the plurality of dielectric layers 111. One of ordinary skill in the art would recognize that when a thickness of the dielectric layer 111 is smaller than a length, a width, or a diameter of the unit area, the unit area may include a portion or portions of one or more internal electrodes, although such a portion or such portions do not have dielectric grains and thus may not be mounted in the measurement. In one example, when a sum of the thickness of the dielectric layer 111 and a thickness of an internal electrode adjacent thereto is smaller than a length, a width, or a diameter of the unit area, the unit area in the measurement may include grains of such a dielectric layer within the unit area, and also include grains of one or more of dielectric layers, adjacent to such a dielectric layer, within the unit area.

Figure 5:
FIGS. 5 and 6 are images of microstructures of a multilayer ceramic capacitor (MLCC) captured with an annular dark field scanning TEM (ADF-STEM)
Figure 6:
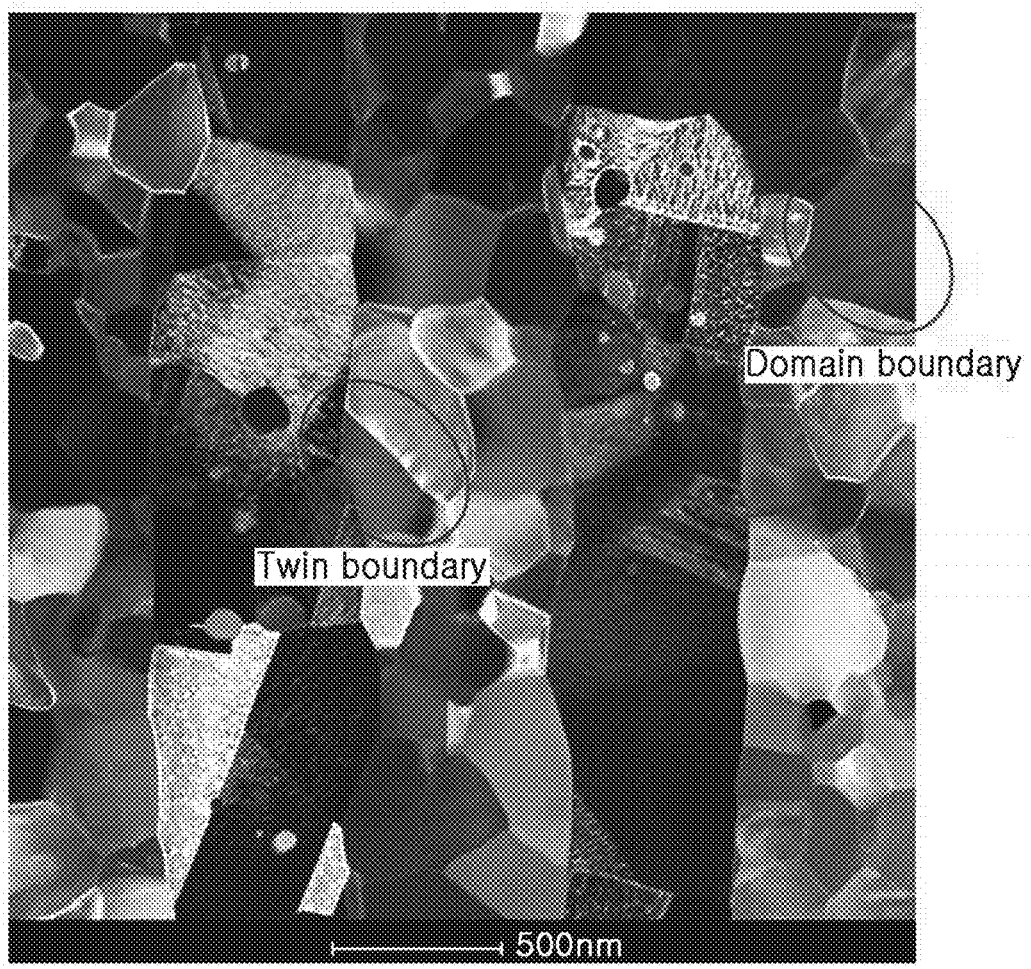

The dislocations D may be determined by observing a microstructure imaged with an annular dark field scanning transmission electron microscopy (ADF-STEM). Other methods and/or tools appreciated by one of ordinary skill in the art, even if not described in the present disclosure, may also be used. FIGS. 5 and 6 are images of a microstructure of an MLCC captured with the ADF-STEM, which are obtained under imaging conditions of an acceleration voltage of 200 kV, a camera length of 110 nm, a magnification of 40,000 times, and a dark field using an Osiris model of FEI. As may be seen in FIG. 5, the dislocations appear as white lines that does not completely traverse the grains. However, in the case of ADF-STEM imaging, a color of the observed dislocations may be changed depending on the camera length (a distance between a sample and an image frame) but the dislocations may be distinguished from other defects by setting measurement conditions in a manner of specifying the camera length (e.g., less than 150 nm). That is, the shape of the dislocations may be clearly distinguished from other results such as twin boundary or domain boundary shown in the microstructure of FIG. 6. In addition, when imaging is performed with ADF-STEM, an acceleration voltage may be adjusted in the range of 80 to 300 kV.

Hereinafter, a method of controlling the density of dislocations and an experimental example will be described. According to the research of the present inventors, when a relatively high reducing atmosphere (hereinafter, referred to as "heavy reducing atmosphere") was formed in sintering the dielectric layer, the density of dislocations was increased. Here, the heavy reducing atmosphere is an atmosphere in which a partial pressure of $H_2$ is relatively high during firing, and this exemplary embodiment is based on a case where a concentration ratio of $H_2$ to $N_2$ was 0.2 to 1.0%. In contrast, a weak reducing atmosphere was based on a case where $H_2$ was less than 0.2% compared to $N_2$ during firing. In the present disclosure, the reducing atmosphere was set based on the concentration of $H_2$, not the partial pressure of oxygen, and this is based on the results of a study that the $H_2$ concentration affects a cation diffusion behavior. In the $H_2$ concentration ratio of 0.2 to 1.0%, 0.2% was set as a lower limit necessary for diffusion control and 1.0% was set as an upper limit according to a side effect of forming oxygen vacancy (IR reduction). In the heavy reducing atmosphere set according to the basis described above, additive components (e.g., Mg) penetrate into the BT phase to form a secondary phase, and thus the rate of penetration of rare earths or the like into the BT phase may be reduced. Accordingly, it is understood that the ratio of forming the cubic phase may be adjusted by the penetration of rare earths or the like, and finally, the amounts of the tetragonal phase and the cubic phase are balanced so that dislocations may be sufficiently formed.

The present inventors prepared samples as Comparative Example and Example and analyzed dislocations present ingrains of the dielectric layer by the following measurement method.

Comparative Example was fired in an atmosphere of 0.1% of $H_2$ compared to $N_2$, while Example was sintered under an atmosphere of 0.56% of $H_2$ compared to $N_2$.

Measurement of 4 points per sample

Measurement magnification: ×40,000

Measurement area: about 3 μm×3 μm (More than 150 grains can be preferably included in the measurement area.)

Figure 7:
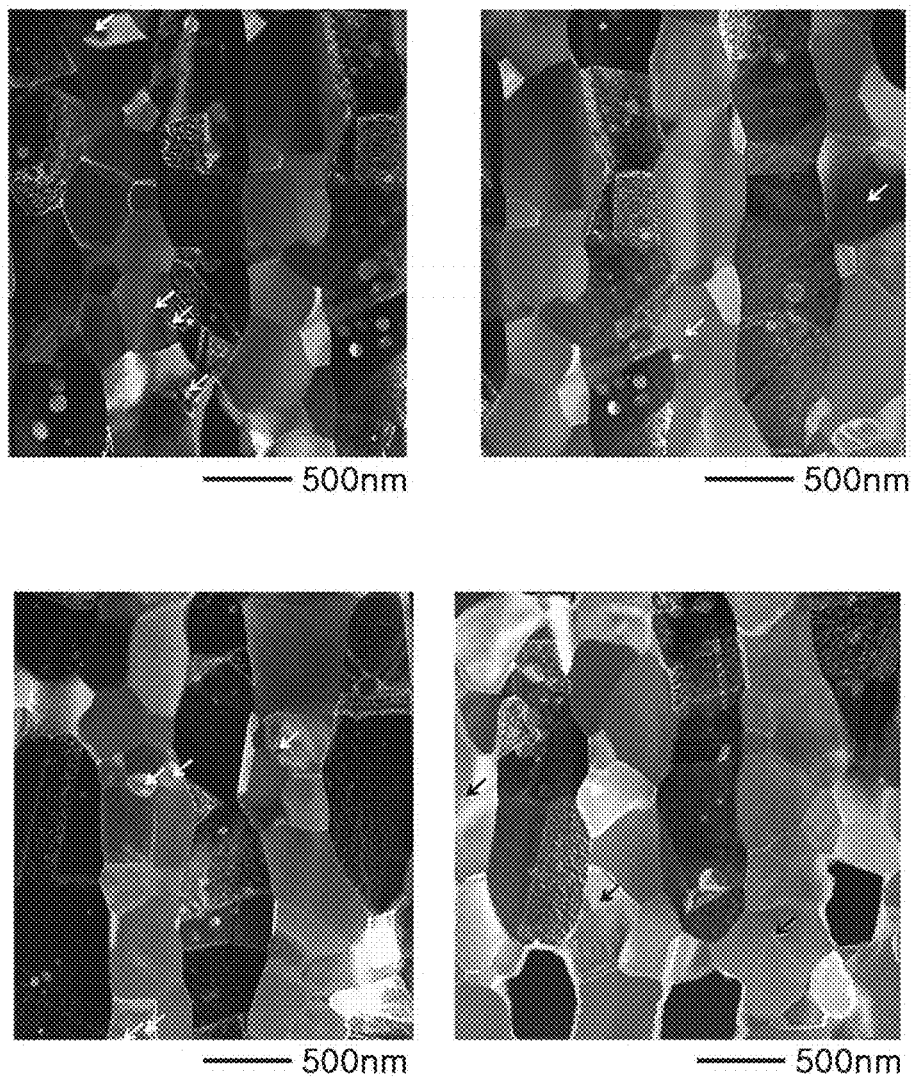
FIGS. 7 and 8 are images of microstructures of grains captured from samples of Comparative Example and Example, respectively.
Figure 8:
Figure 8:
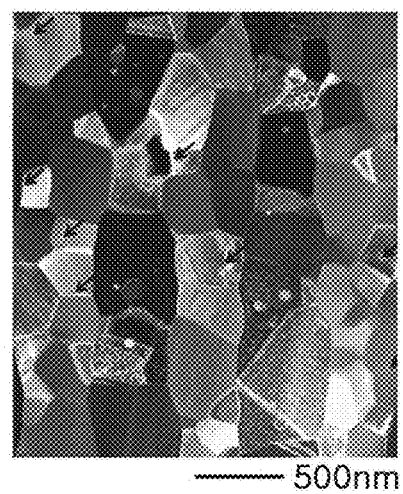
Figure 8:
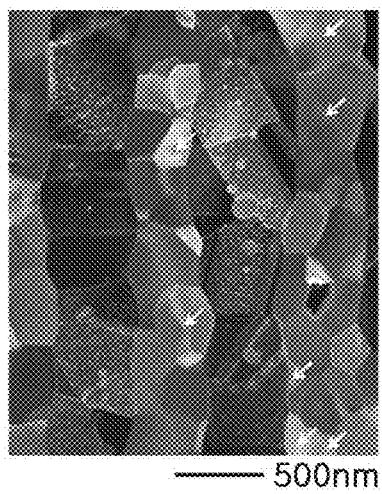
Figure 8:
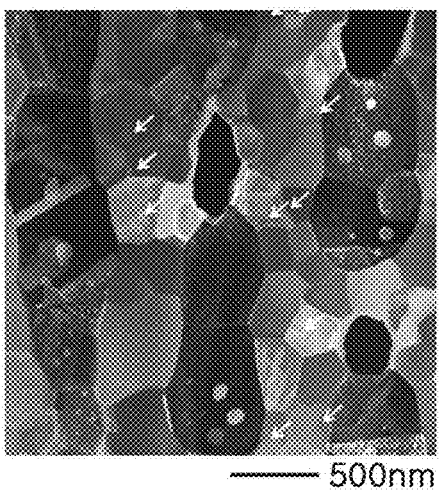

Measurement of the number of grains including dislocations in each measurement area and the number of total grains FIGS. 7 and 8 are images of microstructures of grains captured from samples of Comparative Example and Example, respectively. In FIGS. 7 and 8, portions which correspond to set four points in the cut surfaces of each sample and determined as dislocations are indicated by the arrows. Table 1 below summarizes the ratio of grains having dislocations in Comparative Example and Example.

TABLE 1

|  | Comparative Example |  |  |  | Example |  |  |  |
| --- | --- | --- | --- | --- | --- | --- | --- | --- |
| Point | 1 | 2 | 3 | 4 | 1 | 2 | 3 | 4 |
| Total number of grains (G) | 30 | 41 | 28 | 38 | 39 | 41 | 42 | 43 |
| Number of grains having dislocations (D) | 4 | 3 | 5 | 3 | 6 | 11 | 7 | 11 |
| D/G | 0.13 | 0.07 | 0.18 | 0.08 | 0.15 | 0.27 | 0.17 | 0.26 |
| Average |  | 0.11 |  |  |  | 0.21 |  |  |

Referring to the experimental results, the ratio of grains having dislocations among the plurality of grains was measured as 0.11 (11%) in Comparative Example and 0.21 (21%) in Example.

Figure 9:
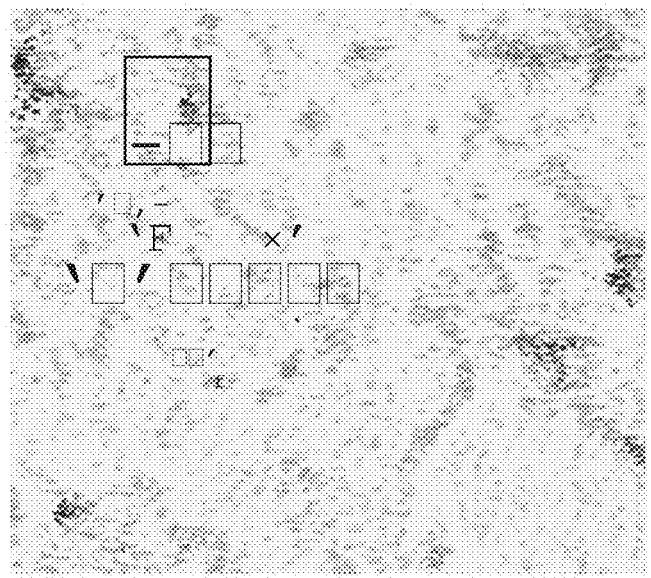
FIGS. 9 to 11 show results of a piezoelectric force microscopy (PFM) $d_{33}$ analysis in Comparative Example and Example, respectively.
Figure 10:
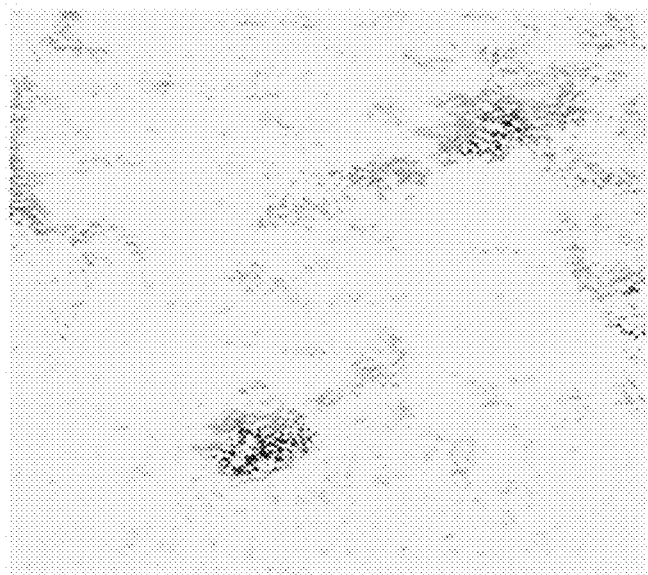
Figure 11:
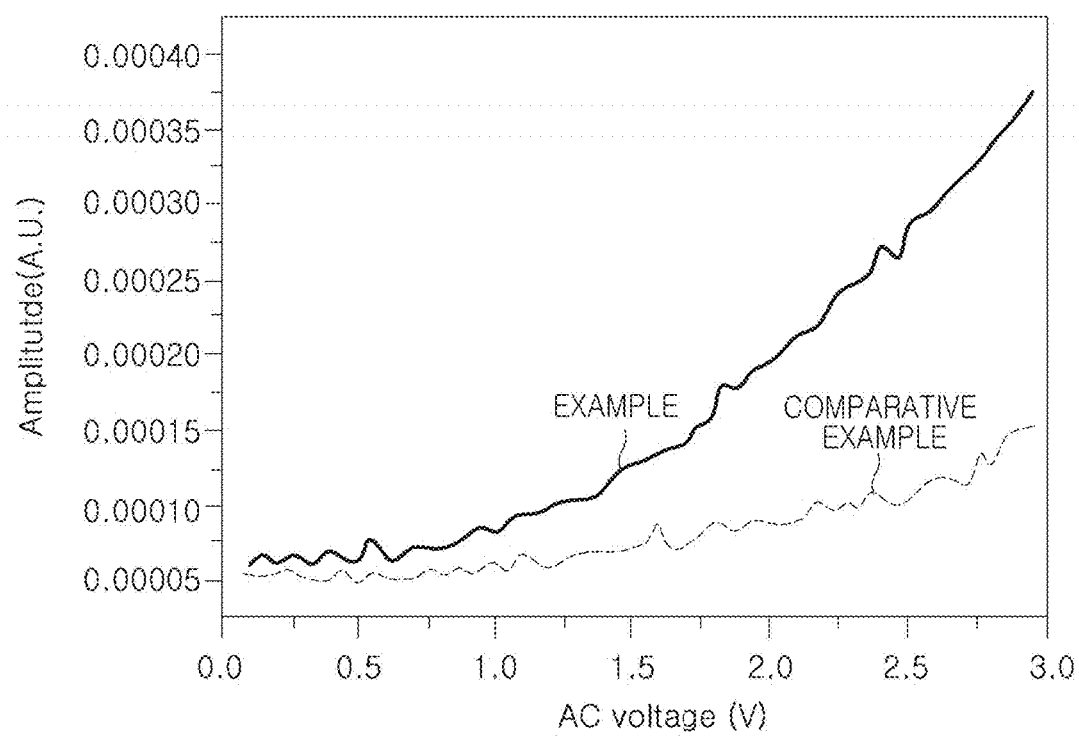

FIGS. 9 through 11 show results of piezoelectric force microscopy (PFM) $d_{33}$ analysis in Comparative Example and Example, respectively, an analysis method of determining the degree of domain alignment and a polarization size by analyzing deviations and amplitude of a $d_{33}$ phase. In this experiment, the PFM analysis was measured at a frequency of 1 Hz in a 1 μm×1 μm area using a Multi75E-G tip from Budget Sensors with an NX10 model from Park System. FIGS. 9 and 10 show a result of mapping on $d_{33}$, in which angles at which domains are aligned in a vertical direction in which a voltage is applied are indicated by color, and the alignment in one direction is made better as color deviation is smaller. As a result of the experiment, in the case of Example (FIG. 10) having a relatively high dislocation density, the color deviation was less than that of Comparative Example (FIG. 9), which means that the domains within the dielectric material are better aligned in the c-axis direction. FIG. 11 is a graph showing a $d_{33}$ amplitude, showing an amplitude of the displacement due to an applied voltage, in which it can be seen that the displacement further increased in Example. The reason for this may be understood as because the size of the overall polarization increases as the domains are well aligned in one direction. The above results show that domains may be better aligned in the direction of the applied electric field by increasing the density of dislocations in the dielectric layer.

Table 2 below illustrates results of measuring a DC bias capacity (C), a capacity reduction rate (ΔC), and a dissipation factor (Df) in Comparative Example and Example.

TABLE 2

| DC voltage | Comparative Example |  |  | Example |  |  |
| --- | --- | --- | --- | --- | --- | --- |
| (V) | C | Df(%) | ΔC(%) | C | Df(%) | ΔC(%) |
| 0 | 48.171 | 7.1 | 0.0 | 48.234 | 8.3 | 0.0 |
| 1 | 38.070 | 7.2 | −21.0 | 38.195 | 8.4 | −20.8 |
| 3 | 15.646 | 4.1 | −67.5 | 16.470 | 5.2 | −65.8 |
| 5 | 8.087 | 1.6 | −83.2 | 8.533 | 2.5 | −82.3 |
| 6.3 | 6.092 | 1.0 | −87.4 | 6.145 | 1.5 | −87.3 |

As can be seen from the above results, as a result of measuring the DC bias capacity of the two samples according to the DC voltage, the DC bias capacity reduction rate in Example having a large dislocation density was lower in all the DC voltage than that of Comparative Example. In the case of Example, it can be seen that, since the DC bias capacity was not improved by suppressing grain growth, the nominal capacity value may be kept almost the same, so that the DC bias capacity may be improved without reducing the capacity.

Figure 12:
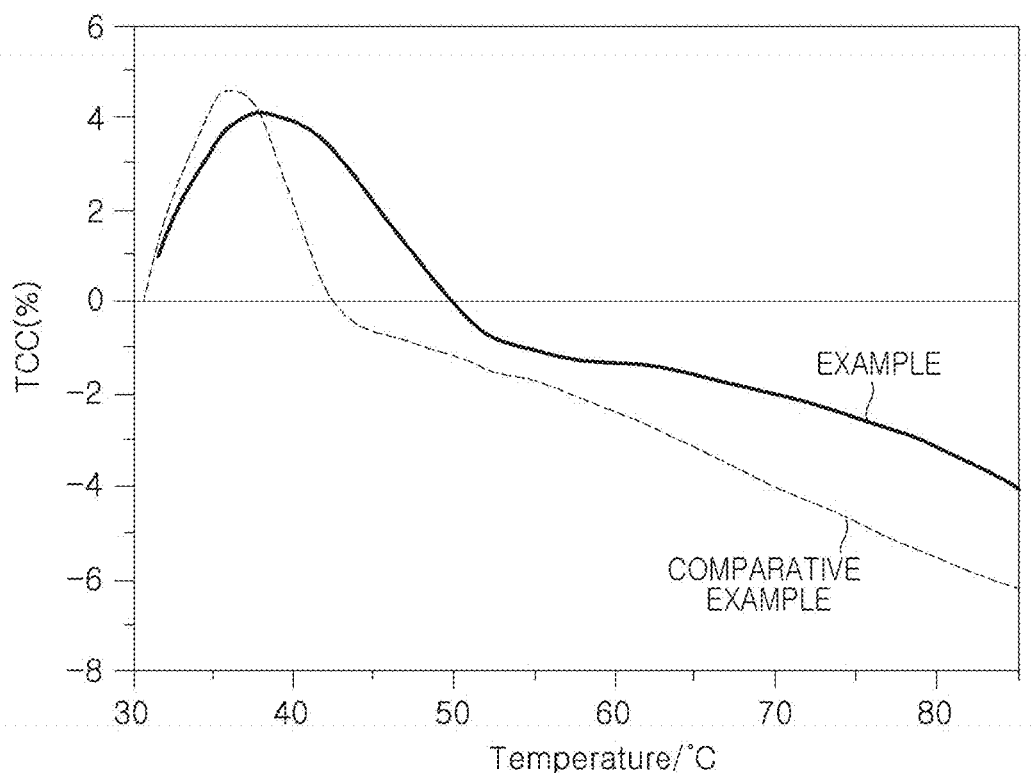
FIG. 12 illustrates results of measuring temperature coefficients of capacitance (TCC) at high-temperature parts in Comparative Example and Example.

In addition, FIG. 12 illustrates results of measuring a temperature coefficient of capacitance (TCC) of a high-temperature part in Comparative Example and Example. It can be seen that, in Example having a high dislocation density, a high-temperature effective capacity was increased, so that a reduction in the high-temperature part capacity was improved by 36.7% based on 85° C.

As described above, the experimental results described above show that the DC bias capacity and the high-temperature effective capacity may be increased by controlling domain alignment and the contribution of extrinsic capacity by increasing the density of dislocations in the grains of the dielectric material.

As set forth above, in the case of the multilayer capacitor according to exemplary embodiments in the present disclosure, a high-temperature effective capacity reduction phenomenon may be minimized, while DC bias capacity is improved.

While exemplary embodiments have been shown and described above, it will be apparent to those skilled in the art that modifications and variations could be made without departing from the scope of the present disclosure as defined by the appended claims.

What is claimed is:

1. A multilayer capacitor comprising:
a body including a multilayer structure in which a plurality of dielectric layers are stacked and a plurality of internal electrodes are stacked with the plurality of dielectric layers interposed therebetween; and
external electrodes disposed on an exterior of the body and connected to the internal electrodes,
wherein at least one of the plurality of dielectric layers comprises barium titanate and includes a plurality of grains, and a ratio of grains having dislocations, among the plurality of grains, is 20% or greater.

2. The multilayer capacitor of claim 1, wherein
the dislocations are spaced apart from grain boundaries between the plurality of grains.

3. The multilayer capacitor of claim 1, wherein
a dislocation in one of the plurality of grains is in contact with only one grain boundary among grain boundaries between the one of the plurality of grains and other grains of the plurality of grains.

4. The multilayer capacitor of claim 1, wherein
a dislocation within one of the plurality of grains is disposed between a phase having a tetragonal crystal structure and a phase having a cubic crystal structure.

5. The multilayer capacitor of claim 1, wherein
a portion of the plurality of grains has a plurality of dislocations.

6. The multilayer capacitor of claim 1, wherein
the ratio of grains having dislocations, among the plurality of grains, is a value obtained by averaging values measured in at least four unit areas among cut surfaces of the dielectric layer.

7. The multilayer capacitor of claim 1, wherein
the ratio of grains having dislocations, among the plurality of grains, is 40% or less.

8. The multilayer capacitor of claim 1, wherein
each of the dislocations is spaced apart from grain boundaries between the plurality of grains, or is in contact with only one grain boundary among the grain boundaries of the plurality of grains.

9. A multilayer capacitor comprising:
a body including a multilayer structure in which a plurality of dielectric layers comprising barium titanate and having grains are stacked and a plurality of internal electrodes are stacked with the plurality of dielectric layers interposed therebetween; and
external electrodes disposed on an exterior of the body and connected to the internal electrodes,
wherein a ratio of grains having dislocations in a region of the body, among grains in the region of the body, is 20% or greater.

10. The multilayer capacitor of claim 9, wherein
in the region of the body, each of the dislocation is spaced apart from grain boundaries between the plurality of grains, or is in contact with only one grain boundary among grain boundaries of the grains.

11. The multilayer capacitor of claim 9, wherein
a dislocation within one of the plurality of grains is disposed between a phase having a tetragonal crystal structure and a phase having a cubic crystal structure.

12. The multilayer capacitor of claim 9, wherein
in the region of the body, a portion of the plurality of grains has a plurality of dislocations.

13. The multilayer capacitor of claim 9, wherein
the ratio of grains having dislocations in the region of the body among the grains in the region of the body is 40% or less.

14. A multilayer capacitor comprising:
a body including a multilayer structure in which a plurality of dielectric layers comprising barium titanate and having grains are stacked and a plurality of internal electrodes are stacked with the plurality of dielectric layers interposed therebetween; and
external electrodes disposed on an exterior of the body and connected to the internal electrodes,
wherein an average of ratios of grains having dislocations among grains respectively obtained in a plurality of unit areas in a cut surface of the body, is 20% or greater.

15. The multilayer capacitor of claim 14, wherein
in each of the unit areas, each of the dislocations is spaced apart from grain boundaries between the plurality of grains, or is in contact with only one grain boundary among grain boundaries of the grains.

16. The multilayer capacitor of claim 14, wherein
a dislocation within one of the plurality of grains is disposed between a phase having a tetragonal crystal structure and a phase having a cubic crystal structure.

17. The multilayer capacitor of claim 14, wherein
in each of the unit areas, a portion of the plurality of grains have a plurality of dislocations.

18. The multilayer capacitor of claim 14, wherein
the average of the ratios is 40% or less.

* * * * *